Dec. 24, 1935.    J. C. BLACK    2,025,409
PROCESS FOR REFINING CRACKED GASOLINE
Filed Nov. 9, 1926    2 Sheets-Sheet 1

INVENTOR
John C. Black
BY
ATTORNEY

Dec. 24, 1935.  J. C. BLACK  2,025,409
PROCESS FOR REFINING CRACKED GASOLINE
Filed Nov. 9, 1926  2 Sheets-Sheet 2

INVENTOR
John C. Black
BY
ATTORNEY

Patented Dec. 24, 1935

2,025,409

UNITED STATES PATENT OFFICE 2,025,409

PROCESS FOR REFINING CRACKED GASOLINE

John C. Black, Destrehan, La., assignor to Gasoline Products Company, Inc., Newark, N. J., a corporation of Delaware Application November 9, 1926, Serial No. 147,294

9 Claims. (Cl. 196—23)

The invention of this application pertains to a process and apparatus for refining gasoline.

I have found that the impurities in crude gasolines, which impurities must be refined out before the gasoline is marketable, concentrate in the heavier boiling fractions of the gasoline in the distillation of the gasoline. Thus the first 20% of a gasoline requires considerably less refining in proportion than does the last 80% of a gasoline. I have found that the refining of a gasoline in the usual methods, that is by treatment with sulphuric acid, alkali, whether hot or cold treatment, with clays, hypochlorites, distillations, etc., entails losses of the volatile ends of the gasoline, and so raises the initial boiling points of the gasoline.

The object of this invention is to prevent this loss of light volatile products by repeated handling and processing, and to so conserve the initial boiling points of the gasoline and the yield. I have also found that by separating the light fraction from the heavier fraction the total amount of treating reagent required is considerably reduced. This is due to the fact that a more accurate proportioning of the amount of reagent which each fraction requires is made possible by the separation of the fractions. The above considerations apply with particular force to cracked gasoline, since these cracked gasolines require a more rigorous treatment to purify them. Much more acid and alkali is required and more "doctor solution" and hypochlorite is required. This means that the loss of light fractions and the savings entailed by the separation from the light fraction and the heavier fraction before treatment is magnified.

Figure 1:
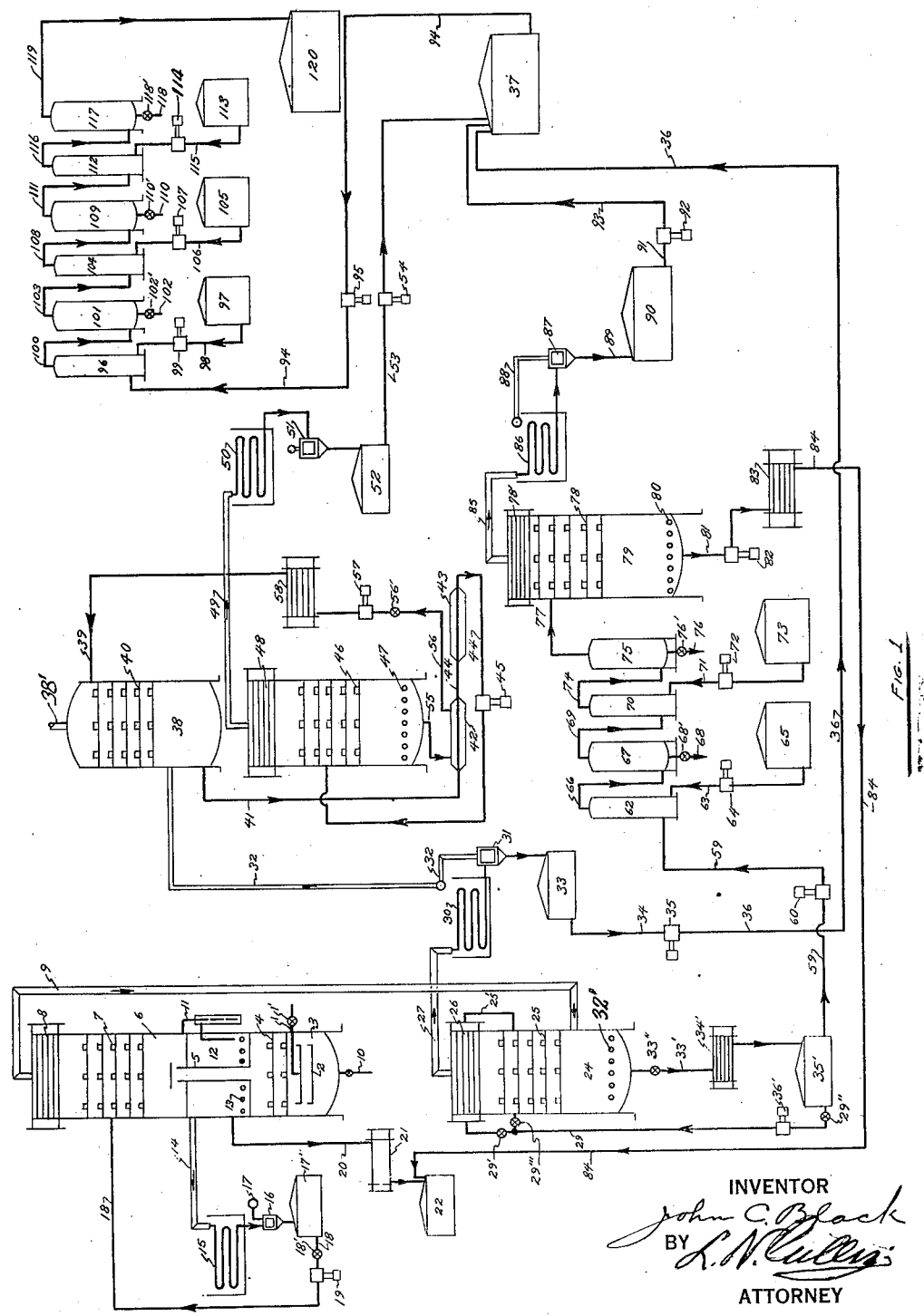
Figure 2:
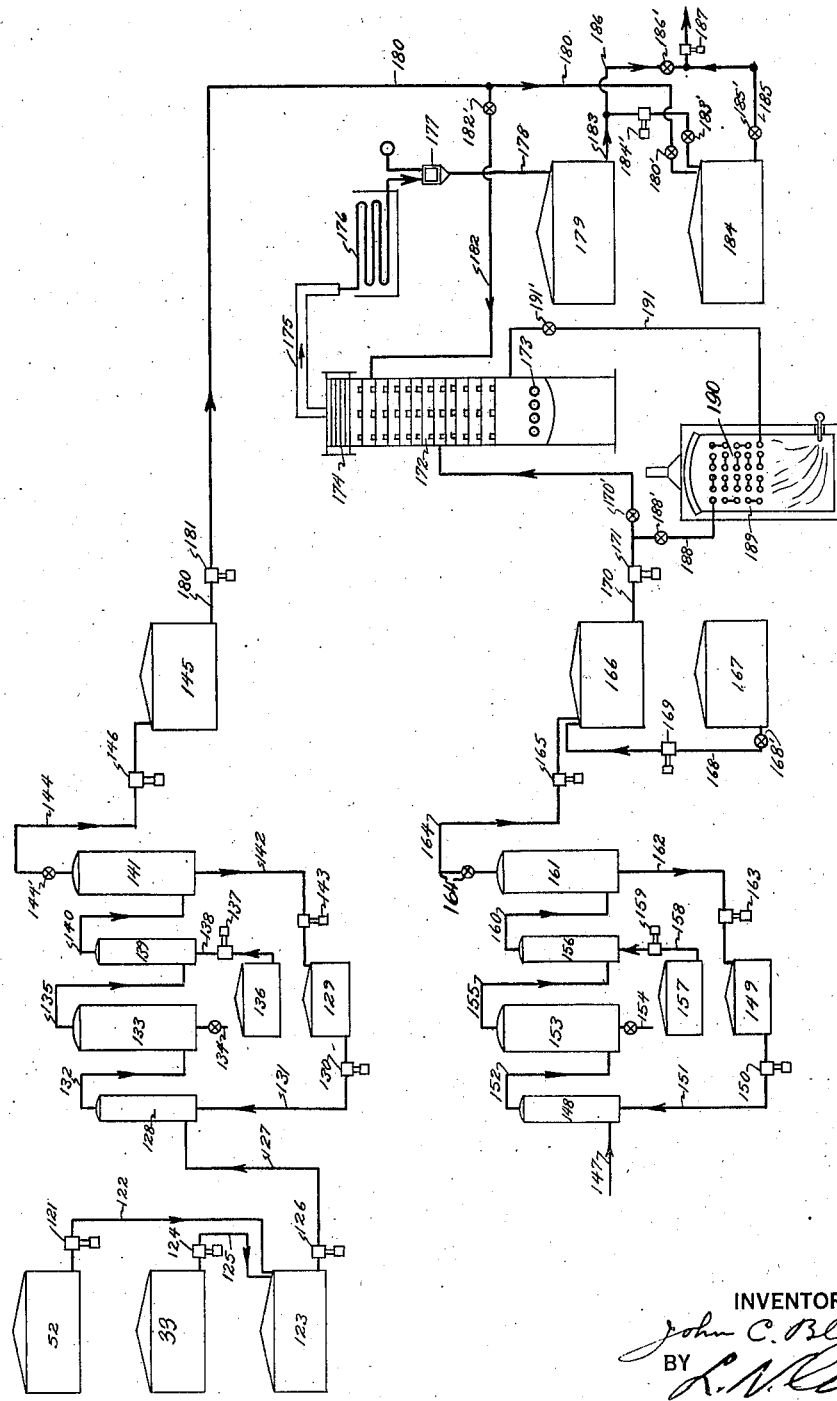

The process will be better understood with reference to the accompanying drawings which show a schematic layout of the apparatus required for carrying out my invention. Figure 1 is a schematic outline of an apparatus required for the treatment of the gasoline according to the process of this application. Figure 2 is a schematic outline of a modified treatment of the several fractions.

In Figure 1, I indicates a line carrying cracked oil, for instance a line coming from a cracking process and apparatus as described in my Patent 1,456,419. I' is a pressure reduction valve in said line. 2 are trays located in evaporator 3. 4 are bubble trays located in evaporator 3. 5 is a vapor line connecting the evaporator 3 with bubble tower 6. 7 are the plates in said bubble tower. 8 is an analyzer in said bubble tower. 9 is a vapor connection connecting the top of bubble tower 6 with bubble tower 24. 10 is a valved residuum drawoff from evaporator 3. 11 is a liquid trap for removing liquid condensate collected in tower 6. 12 is an evaporator to which trap 11 connects. 13 are steam coils in said evaporator. 14 is a vapor line for removing vapors generated in chamber 12. 15 is a condenser connected with said vapor line. 16 is a lookbox situated in condensate run down line. 17 is a vapor vent for said lookbox. 17' is a condensate tank for collecting condensate passing from lookbox 16. 18 is a line connecting tank 17' and the upper trays of bubble tower 6. 18' is a valve in said line. 19 is a pump in said line. 20 is a condensate drawoff for separating unvaporized residuum from evaporator 12. 21 is a cooler in said line. 22 is a tank connected to said drawoff.

25 are bubble trays in the aforementioned bubble tower 24. 26 is an analyzer connected in the top of said bubble tower. 27 is a vapor line connecting the top of said bubble tower to condenser 30. 29 is a line connecting tank 35' with analyzer 26. 29' and 29'' are valves in said line. 29''' is a valved bypass connecting line 29 with bubble tower 24. 25' connects analyzer 26 with the trays 25, bubble tower 24. 36' is a pump in line 29. 31 is a lookbox in condensate run down line which connects condenser 30 with tank 33. 34 is a line connecting condensate tank 33 with pump 35. 36 is a line connecting pump 35 with blending tank 37.

38 is an absorber to which is connected the gas line 32. 39 is a line for introducing absorption oil into the said absorber. 40 are bubble trays in said absorber. 41 is a line for removing rich absorption oil from absorber 38. 42 is a heat exchanger connected with line 41. 44 is a line connecting said heat exchanger via heater 43 and pump 45 to still 46. The distillation in said still is aided by coils 47 and the rectification aided by analyzer 48. 49 is a vapor line connecting the top of still 46 with condenser 50. 51 is a vented lookbox in condensate run down line, which connects condenser 50 with tank 52. 53 is a line connecting tank 52 with blending tank 37. 54 is a pump in said line. 55 is a line removing the stripped absorption oil from the bottom of still 46. Said line connects to heat exchanger 42. 56 is a line connecting exchanger 42 with cooler 58. 56' is a valve in said line. 57 is a pump in said line. 39 is the aforementioned line connecting cooler 58 with absorption tower 38.

59 is a line connecting tank 35' with the treating unit for the heavy ends of the cracked gasoline removed from bubble tower 24. 60 is a pump in line 59. 62 shows schematically an acid treating mixer, to the bottom of which are connected line 59 and line 63. Line 63 connects via pump 64 with acid tank 65. 67 is a separator. Line 66 connects treater 62 with separator 67. 68, controlled by valve 68', is an acid sludge draw-off from separator 67. 69 is a line connecting separator 67 with alkali treater 70. To the bottom of said alakali treater is connected alkali tank 73 by means of line 71 and pump 72. 75 is a separator, to which is connected treater 70 by means of line 74. 76, controlled by valve 76', is an alkali drawoff from separator 75. 77 is a line for removing the gasoline from 75.

79 is a still, to which is connected line 77. 78 are bubble trays in said still. 78' is an analyzer in said still. 80 are steam coils in said still. 81 is a residuum drawoff in which is pump 82 and cooler 83. 84 is a line connecting cooler 83 with tank 22. 85 is a vapor line connecting the top of still 79 with condenser 86. 87 is a lookbox in condensate run down line 89. 88 is a vapor vent connected with said lookbox. 90 is a condensate tank connected to line 89. 91 is a line connecting tank 90 with pump 92. 93 is a line connecting pump 92 with tank 37.

94 is a line connecting the blending tank 37 with a treating unit. In this line is pump 95. 96 is an acid treating agitator, to which is connected line 94 and line 98, which line connects with acid tank 97 and has in it pump 99. 100 is a line for connecting the treater 96 with separator 101. 102, controlled by valve 102', is an acid drawoff from the separator. 103 is a gasoline drawoff from the separator connected to alkali treater 104. The bottom of 104 is connected to alkali tank 105 by means of line 106 and pump 107. 108 connects the alkali treater 104 with separator 109, to which separator is connected alkali drawoff 110, controlled by valve 110'. Gasoline draw off line 111 connects separator 109 with the hypochlorite treater 112, to which is connected hypochlorite tank 113 by means of line 115 and pump 114. Separator 117 is connected to treater 112 by means of line 116. 118, controlled by valve 118', is a hypochlorite drawoff from separator 117. 119 is a gasoline drawoff from separator 117 to finished gasoline tank 120.

Figure 2 shows a modification for treating various fractions separated thus: The gasoline from tank 52 of Figure 1 and tank 33 of Figure 1 are blended by means of pump 121, line 122, pump 124, line 125 and tank 123. 126 is a pump in line 127, connecting the tank 123 with the treater 128. 129 is a diluted alkali tank which is connected to treater 128 by means of line 131 and pump 130. 132 is a line connecting treater 128 with separator 133. 134 is a valved drawoff line connected to separator 133. 135 is a line connecting separator 133 with alkali treater 139. 136 is an alkali tank. 138 is a line connecting alkali tank 136 with treater 139. 137 is a pump in said line. 141 is a separator which is connected to treater 139 by line 140. 142 is a line connecting separator 141 with tank 129. 143 is a pump in said line. 144 is a line connecting separator 141 with tank 145. 144' is a valve in said line. 146 is a pump in said line.

147 is a line for introducing the acid treated heavy gasoline from treater 62 and separator 67 of Figure 1 into alkali treater 148. To 148 is connected line 151, in which is pump 150, which pump is connected to alkali tank 149. 152 connects the alkali treater with separator 153. To the separator is connected valve alkali drawoff 154. 155 connects separator 153 with alkali treater 156. To this alkali treater is connected alkali tank 157 by means of line 158 and pump 159. 160 connects treater 156 with separator 161. 162 is a line connecting separator 161 with tank 149. 163 is a pump in said line. 164, in which there is a valve 164', connects the separator 161 with tank 166. 165 is a pump in said line. 167 is a crude oil tank. 168 is a line connecting tank 167 with tank 166. 168' is a valve in said line. 169 is a pump in said line. 170 is a line connecting tank 166 with still 172. 170' is a valve in said line. 171 is a pump in said line. 174 is an analyzer in said still. 173 are steam coils in said still. 175 is a vapor line connecting said still with condenser 176. 177 is a lookbox situated in condensate run down line 178, which connects condenser 176 with tank 179. 180 is a line connecting tank 145 with tank 184. 181 is a pump in said line. 182 is a bypass line connecting line 180 with still 172. 182' is a valve in said line. 180' is a valve in line 180. 183 is a line connecting tank 179 with tank 184. 184' is a pump in said line and 183' is a valve in said line. 185 is a line connecting tank 184 with pump 187. 185' is a valve in said line. 186 is a line connecting tank 179 with pump 187. 186' is a valve in said line. 188 is a line connecting line 170 with heater 190 in furnace 189. 191 is a line connecting 190 with still 172. 191' is a valve in said line.

The operation of this process is as follows:

The cracked gasoline vapor formed in any manner, as for instance by the evaporation of the cracked oil, expanded through valve 1' and spread on pans 2, the vapors from which rise through plates 4, where they are scrubbed of any heavy fractions, rise through riser 5 and are fractionated in tower 6. The heavy ends of these fractions, which consist of uncracked oils and heavy ends of the gasoline, are passed into chamber 12 where they are redistilled by the aid of steam from coils 13, and the heat of the vapors rising through riser 5. The vaporous fraction, consisting of the heavy ends of the gasoline fraction and some gas oil, passes through line 14, is condensed in condenser 15, collected through lookbox 16 in tank 17'. This condensate is picked up by pump 19 and pumped into line 18, into bubble trays 7 where it is redistilled, acting as a reflux. The gasoline portion of the condensate passing in through 18 is vaporized and the gas oil fraction passes down and is collected in 6. The unvaporized fraction from 12, which consists of gas oil, is passed down through line 20 into cooler 21 and is collected in tank 22. This fraction may be used as a recycle oil in the cracking process together with make up oil, or in any other manner desired. The crude gasoline passes out through line 9 and passes into the fractionating tower 24 where it is fractionated by aid of liquid passing through the analyzer 26, and injected into tower 24, and passing over the plates 25. The condensate formed and collected in 24 consists of the heavy ends of the gasoline fraction. This may be further stripped by steam introduced into the bottom of tower 24 through steam coils 32'. The overhead passing through 27 consists of the light ends of the gasoline fraction and includes, of course, extremely light and gaseous constituents undesired in the final gasoline product. The percent of overhead through 27 can be regulated to any desired amount by the correct control of the fractionating equipment.

The heavy ends of the gasoline fraction collected in 24 are removed through line 33′ and valve 33″, cooled by cooler 34′ and collected in tank 35′, pumped via pump 36′ through line 29, as previously stated. The amount of oil passing through analyzer 26 is regulated by bypass 29‴. The gasoline is constantly removed by pump 60 through line 59 and separately treated. This treatment may consist of any conventional type of treatment with acid and alkali, etc., or may be a hot alkali treatment as described in Patent 1,592,329.

As described in Figure 1, this treatment consists of an initial acid treat. The gasoline is pumped by pump 60 into mixer 62 where it meets acid from tank 65, which is pumped by pump 64, line 63, into mixer 62. The acid treated gasoline is then pumped through line 66 into separator 67. The acid sludge and excess acid are removed through line 68 and the acid treated gasoline passes through line 69 into the alkali treater 70, where it meets an alkali wash, alkali being taken from tank 73 by pump 72, line 71. An intermediate water wash may be employed if desired. The thus treated gasoline is passed to a separator where the excess alkali is removed through connection 76, and the alkali treated gasoline passed through line 77 to still 79. In still 79 the gasoline is steam stilled and the overhead is collected via line 85, cooler 86, in tank 90. The heavy ends which are unvaporized are removed from the still via line 81, cooler 83, and passed to tank 22 to mix with the oil removed from evaporator 12. The condensate collected in tank 90 is the refined heavy ends of the gasoline. The light fraction issuing through line 27 is condensed in 30 and collected in 33. The uncondensed gases pass, together with the uncondensed fractions from all the look-boxes, into scrubber 38 where they are washed by a conventional absorption system, as for instance in absorber 38 where they are washed by oil introduced through 39 over plates 40. The charged oil is passed through heat exchanger 42 via heater 43 through line 44 and pump 45 into still 46 where it is distilled by aid of steam introduced via coils 47 and rectified by use of analyzer 48. The unvaporized oil, which consists of the original wash oil, is removed through exchanger 42, line 56 and cooler 58, by means of pump 57, and sent to absorber 38 where it passes over the bubble trays 40. The vapor passes through line 49, condenser 50, where it is condensed and the condensate collected in tank 52. This condensate is absorption gasoline and consists of the very light fraction of the gasoline. This gasoline is blended with the other fractions in tank 37 in the correct proportion. As in other absorbers of conventional type the uncondensable gases leave the tower 38 through a vent or line 38′.

This blended gasoline is still "doctor sour", i. e. will give a positive result by the well known "doctor test", and in order to make it sweet it is given a final chemical treatment. For instance, gasoline is pumped through line 94, pump 95, into acid treater 96 where it is given a light acid wash by means of acid pumped from tank 97, line 98, pump 99, into treater 96. The acid treated gasoline is then separated from the acid sludge and excess acid in separator 101. The separated gasoline, which may be water washed, is then given an alkali wash in treater 104 by means of alkali pumped from alkali tank 105, line 106 and pump 107, and the alkali separated from the gasoline in separator 109. The separated gasoline is then pumped into treater 112 where it is treated with sodium hypochlorite pumped from tank 113 through line 115, pump 114. The gasoline is separated from the excess hypochlorite in separator 117 and the finished "doctor sweet" gasoline collected in tank 120.

Instead of treating the fractions as above mentioned the mixture of absorption gasoline and light gasoline cut may be treated together and then mixed with the treated heavy ends. For instance the absorption gasoline in tank 52 and the light cut in tank 33 may be blended in tank 123, and the blended light gasoline cuts treated as described in the aforementioned Patent 1,592,329.

The gasoline is first acid treated, and the acid treated gasoline is then passed to treater 128 where it is mixed with diluted alkali from tank 129, and the excess acid neutralized. The alkali is separated from the gasoline in separator 133 and given a treatment with concentrated alkali at an elevated temperature under pressure in treater 139. The gasoline is separated from the alkali in 141 and the diluted alkali pumped through 142 into tank 129. The treated gasoline is collected in tank 145. The heavy gasoline which has been acid treated is passed through a similar treatment where it is first given a diluted alkali wash in 148 by means of alkali pumped from 149, and the alkali separated in separator 153. The gasoline is then given a treatment with more concentrated alkali at an elevated temperature in tank 156 by heating the mixture of alkali and gasoline under pressure. The gasoline is separated from the alkali in 161 and diluted alkali pumped via line 162 into tank 149. The treated gasoline is pumped via 164 into tank 166 where it is mixed with crude oil from 167. The mixture is then pumped via line 170, heater 190, and distilled in still 172. Instead of mixing it with crude oil the gasoline may itself be steam stilled in still 172 by by-passing the heater 190. The gasoline from tank 145 may be pumped into still 172 to act both as a wash oil and to obtain a blended gasoline. The overhead passes through line 175.

In operating without this vapor phase blending the gasoline is condensed in 176 and collected in 179 and blended with the gasoline from 145 in tank 184. The blended gasoline is removed through line 185 and pump 187, valve 186′ being closed, and pumped to final chemical treatment as in the previous case, in the instance of the gasoline pumped from the blended gasoline tank 37.

If the blending has been made in the vapor phase the blended gasoline in 179 is removed via pump 187 by closing valve 185′ and 183′ and opening valve 186′, and the blended gasoline is then given the final chemical treatment as previously indicated.

Instead of giving the absorption gasoline and the light gasoline fraction an acid and a hot alkali treatment, the blended fractions may be merely washed with concentrated alkali at ordinary temperatures. I have found this sufficient preliminary treatment.

As a specific example of the treatment the following may be given as an illustration. A cracked gasoline generated via line 9 is fractionated in fractionating tower 24 so as to obtain approximately 30% overhead and 70% of condensed fractions. This 30% is condensed to produce 20% of light gasoline cut, which is blended with the absorption gasoline, which corresponds usually to 10% of the total gasoline issuing through 9. The heavy end which is removed through 33' is treated as usual with acid and alkali, and the final blended product in 37 is given a light acid treat with about 1½# of acid to the barrel of gasoline, and the usual treatment with alkali and hypochlorite or plumbite to make the gasoline "doctor sweet", i. e. so it shows a negative result by the well known test with "doctor solution". By so operating it will be found that there has been a marked conservation of light products by showing a lower end point and increased yield.

If the process as indicated by Figure 2 is employed the blended light gasoline cut and absorption gasoline is treated with acid, then with diluted alkali, and with more concentrated alkali at an elevated temperature of about 200° F. and about 50# pressure, by either preheating the gasoline and alkali before introduction into treater 139, or by use of steam in the treater 139. The separated gasoline is blended as previously indicated. The heavy gasoline cut is treated in a similar manner and distilled and blended as indicated above. This treatment by hot alkali shows a marked reduction in the sulphur content, and also in the gum forming constituents of the gasoline.

Instead of treating the gasoline with hot alkali as here indicated the treatment with hot doctor solution is found very effective.

If a cold alkali treatment is used for the light gasoline cut and the absorption gasoline they may be treated in the cold with concentrated alkali and blended as above.

The gasoline I treat is generally designated as "naptha", in oil refinery terminology. Naptha is the name given to an untreated or impure gasoline stock. Therefore, in order to more accurately set forth my invention, I have used the term "naptha" in the appended claims.

The above is not to be taken as limiting my invention but merely as illustrative of the best manner of carrying out my invention, which I claim to be:

1. The process of preparing marketable products from a mixture of hydrocarbons consisting chiefly of compounds of the gasoline range, which comprises subjecting the mixture in vapor form to partial condensation to produce a first condensate requiring chemical treatment and a second vapor which requires no chemical treatment and which represents at least 20% of the said mixture being treated, separating the second vapor into liquid products substantially free of normally gaseous hydrocarbons and into a gas, chemically treating the first condensate while it is in substantially the same condition it was in when separated in said partial condensation operation, and blending the treated condensate with the liquid products separated from the second vapor.

2. The process of preparing marketable products from a mixture of hydrocarbons consisting chiefly of compounds of the gasoline range, which comprises subjecting the mixture in vapor form to partial condensation to produce a first condensate requiring chemical treatment and a second vapor which requires no chemical treatment and which represents at least 20% of the said mixture being treated, separating the second vapor into liquid products substantially free of normally gaseous hydrocarbons and into a gas, chemically treating the first condensate while it is in substantially the same condition it was in when separated in said partial condensation operation, blending the treated condensate with the liquid products separated from the second vapor and thereafter subjecting the blended product to a sweetening treatment.

3. The process of preparing marketable products from a mixture of hydrocarbons consisting chiefly of compounds of the gasoline range, which comprises subjecting the mixture in vapor form to partial condensation to produce a first condensate requiring chemical treatment and a second vapor which requires substantially no chemical treatment and which represents at least 20% of the said mixture being treated, separating the second vapor into liquid products substantially free of normally gaseous hydrocarbons and into a gas, chemically treating the first condensate and blending the treated condensate with the liquid products separated from the second vapor after separation therefrom of said normally gaseous hydrocarbons.

4. The process of preparing marketable products from a mixture of hydrocarbons consisting chiefly of compounds of the gasoline range, which comprises subjecting the mixture in vapor form to partial condensation to produce a first condensate requiring chemical treatment and a second vapor which requires substantially no chemical treatment and which represents at least 20% of the said mixture being treated, separating the second vapor into liquid products substantially free of normally gaseous hydrocarbons and into a gas, chemically treating the first condensate, blending the treated condensate with the liquid products separated from the second vapor after separation therefrom of said normally gaseous hydrocarbons and thereafter subjecting the blended product to a sweetening treatment.

5. The method of treating the vaporous and gaseous mixture produced in the cracking of hydrocarbon oils, which comprises dephlegmating the mixture of vapors and gases to condense and separate therefrom constituents heavier than gasoline, subjecting gasoline and normally gaseous constituents thereby freed from constituents heavier than gasoline to rectification at a temperature substantially above atmospheric to separate therefrom in liquid form a heavy gasoline cut while withdrawing in vapor form from said rectification stage a fraction containing at least 20% of the total desired gasoline product, and separating desired light gasoline constituents from normally gaseous constituents contained in the fraction withdrawn in vapor form from said rectifying stage, the separation of at least the lightest gasoline constituents being effected in a stage wherein a hydrocarbon absorbent oil passes countercurrent to vapors and exerts a selective action thereupon and in the absence of the previously separated heavy gasoline cut.

6. The process of recovering refined gasoline from a mixture of hydrocarbons consisting chiefly of compounds of the gasoline range and normally gaseous hydrocarbons, which comprises subjecting the mixture to rectification at a temperature substantially above atmospheric to produce a first fraction comprising heavy gasoline requiring refining and a second fraction containing gasoline constituents which do not require drastic refining and which comprise at least 20% of the desired gasoline constituents in the dephlegmated vapors, separating the second fraction into liquid products comprising light gasoline substantially free from normally gaseous hydrocarbons and into a gas, the separation of at least the lightest gasoline constituents being effected in a stage wherein a hydrocarbon absorbent oil passes countercurrent to vapors and exerts a selective action thereupon and in the absence of the previously separated heavy gasoline fraction, refining said heavy gasoline fraction and blending the refined heavy gasoline with the liquid products separated from the second fraction.

7. The process of recovering refined gasoline from a mixture of hydrocarbons consisting chiefly of compounds of the gasoline range and normally gaseous hydrocarbons, which comprises subjecting the mixture to rectification at a temperature substantially above atmospheric to produce a first fraction comprising heavy gasoline requiring drastic chemical refining and a second fraction containing gasoline constituents which do not require drastic chemical treatment and which comprises at least 20% of the desired gasoline constituents in the dephlegmated vapors, separating the second fraction into liquid products comprising light gasoline substantially free from normally gaseous hydrocarbons and into a gas, the separation of at least the lightest gasoline constituents being effected in a stage wherein a hydrocarbon absorbent oil passes countercurrent to vapors and exerts a selective action thereupon and in the absence of the previously separated heavy gasoline fraction, chemically refining said heavy gasoline fraction and blending the treated heavy gasoline with the liquid products separated from the second fraction.

8. The process of recovering refined gasoline from a mixture of hydrocarbons consisting chiefly of compounds of the gasoline range and normally gaseous hydrocarbons, which comprises subjecting the mixture to rectification at a temperature substantially above atmospheric to produce a first fraction comprising heavy gasoline requiring refining and a second fraction containing gasoline constituents which do not require drastic chemical treatment and which comprise at least 20% of the desired gasoline constituents in the dephlegmated vapors, separating the second fraction into liquid products substantially free from normally gaseous hydrocarbons and into a gas in the absence of said heavy gasoline fraction, subjecting said heavy gasoline fraction to a chemical treatment and a redistillation to remove undesired impurities therefrom, and blending the thereby refined heavy gasoline with liquid products separated from the second fraction.

9. The process of recovering refined gasoline from a mixture of hydrocarbons consisting chiefly of compounds of the gasoline range and normally gaseous hydrocarbons, which comprises subjecting the mixture to rectification at a temperature substantially above atmospheric to produce a first fraction comprising heavy gasoline requiring drastic chemical treatment and a second fraction containing gasoline constituents which do not require drastic chemical treatment and which comprise at least 20% of the desired gasoline constituents in the dephlegmated vapors, separating the second fraction into liquid products substantially free from normally gaseous hydrocarbons and into a gas, in the absence of said heavy gasoline fraction, subjecting said heavy gasoline fraction to a relatively drastic chemical treatment and a re-distillation to remove undesired constituents therefrom, subjecting liquid products separated from the second fraction to a relatively mild chemical treatment, and blending the thereby refined heavy gasoline with the thereby refined liquid products separated from the second fraction.

JOHN C. BLACK.